United States Patent [19]
Plangetis

[11] Patent Number: 5,279,247
[45] Date of Patent: Jan. 18, 1994

[54] SUBMARINE MAST FAIRING BEARING CONFIGURATION

[75] Inventor: Gus F. Plangetis, Annapolis, Md.

[73] Assignee: The United States of America as represented by the Secretary of the Navy, Washington, D.C.

[21] Appl. No.: 723,125

[22] Filed: Jun. 28, 1991

[51] Int. Cl.$^5$ .............................................. B63G 8/04
[52] U.S. Cl. ..................................................... 114/339
[58] Field of Search ............... 114/312, 339, 340, 341, 114/342, 314; 384/15, 42, 909; 244/218; 359/402

[56] References Cited

U.S. PATENT DOCUMENTS

| | | | |
|---|---|---|---|
| 1,558,089 | 10/1925 | Heinrich | 244/218 |
| 1,716,314 | 6/1929 | Kautz | 244/218 |
| 2,173,192 | 9/1939 | Williams | 114/340 |
| 2,423,095 | 7/1947 | Gibson | 244/218 |
| 3,885,837 | 5/1975 | Mellor | 384/42 |
| 3,902,771 | 9/1975 | Daugherty | 308/36.1 |
| 4,756,630 | 7/1988 | Teeslink | 384/42 |
| 4,773,769 | 9/1988 | Church | 384/42 |

*Primary Examiner*—Ed Swinehart
*Attorney, Agent, or Firm*—Howard Kaiser

[57] ABSTRACT

Bearing apparatus for submarine mast fairing or other cylindroid member, featuring at least one stave bearing which is made an integral part of the fairing or other cylindroid member and which is tangentially and supportively engaged by a complementary structural bearing which is coupled with the submarine sail or other supporting structure. Utilization of the stave bearing surface rather than the cylindroid member surface in the bearing engagement permits utilization of superior materials for the mating elements and consequent improvement in wear, noise and maintenance characteristics of the bearing assembly. For some embodiments an adjustable housing for the complementary bearing allows for wear of the stave bearing and complementary bearing by providing adjustability of the clearance distance at the interface between these two mating elements. Additional structural support can be provided by one or more bushings, molds and/or other reinforcement members. At the same time, this invention offers requisite camouflage capabilities in terms of coloration for many submarine applications.

19 Claims, 2 Drawing Sheets

SUBMARINE MAST FAIRING BEARING CONFIGURATION

The invention described herein may be manufactured and used by or for the Government of the United States of America for governmental purposes without the payment of any royalties thereon or therefor.

BACKGROUND OF THE INVENTION

The present invention relates to bearing apparatus, more particularly bearing apparatus for mounting submarine mast fairing structures.

Submarine vessels have conventionally been constructed with one or more elevated structures or vertical projections situated above the main deck or superstructure. These mast structures have housed various functional items, such as navigational bridges, observation or conning towers, periscopes, antennas, snorkels and armaments.

In order to reduce consequent deleterious hydrodynamic, buoyant and even aerodynamic effects of such mast structures, auxiliary submarine structures commonly referred to as "mast fairings" have conventionally been built so as to enclose or surround the mast structures. As early as 1911, for example, U.S. Pat. No. 1,072,393 for "Submersible-Boat Construction" recognized the benefit of providing auxiliary structure of this nature, a "tapered fairwater" which serves to "decrease the resistance of the projecting parts, especially while running submerged." (U.S. Pat. No. 1,072,393, page 1, lines 37–42).

The established practice for mounting a submarine mast fairing involves direct contact of the fairing with a bearing which is attached to the submarine sail structure; i.e., each bearing is run directly against the outer side of the fairing skin. This approach, however, has some drawbacks. It is noted that the conventionally used materials for the mast fairing and the structural bearing do not lend themselves, in combination, to this bearing-on-fairing configuration. Typically, the mast fairing is made of a composite material such as fiberglass, while the structural bearing is made of a metallic material or a plastic or resin material such as ultra high molecular weight polyethelene. The fiberglass material and ultra high molecular weight polyethelene, for example, are not suitable for being combined in this manner in terms of both wear and noise; notably, the fiberglass material in and of itself does not provide a good bearing surface and is qualitatively lacking for this purpose. Wear and noise are markedly heightened for submarine mast fairings which are retractable—i.e., fairings which ride up and down while housed within the submarine sail.

The resultant wearing down of the fairing in accordance with this conventional bearing-on-fairing configuration all too frequently necessitates reconditioning or replacement of the fairing. The reconditioning process is laborious, expensive and time-consuming. The useful life expectancy of the fairing is limited, as the fairing will eventually be worn to the point that it falls to meet thickness and strength requirements.

The heavy wear upon the fairing and structural bearing in this bearing configuration aggravates the acoustic signature of the submarine, especially during retractile movement of the fairing system. This conventional approach is acoustically deficient for the additional reason that it is detrimental and hindering to communications systems located in modern submarine sails.

OBJECTS OF THE INVENTION

In view of the foregoing, it is an object of the present invention to provide a submarine mast fairing bearing configuration which improves the wear characteristics of the fairing system.

It is a further object of the present invention to provide a submarine mast fairing bearing configuration which improves the noise characteristics of the fairing system.

Yet another object is to provide a submarine mast fairing bearing configuration which can satisfy submarine camouflage requirements.

Another object of this invention Is to provide a bearing configuration which improves the wear and noise characteristics of submarine fairing-like systems for non-submarine applications.

SUMMARY OF THE INVENTION

The present invention provides bearing apparatus for mounting closely and axially projectingly a generally cylindroid member at least partially within a generally ellipsoid hole in a structure. The bearing apparatus comprises at least one stave bearing integrated with the member and at least one complementary bearing coupled with the structure. Each stave bearing defines a band which longitudinally extends in a substantially axial direction and has an outer surface which is substantially flush with the outer wall of the member. Each complementary bearing tangentially and supportively engages one stave bearing. For those embodiments wherein the bearing apparatus is for retractably mounting the member, each complementary bearing slidably engages one stave bearing.

For submarine applications the present invention provides bearing apparatus for mounting closely and substantially vertically a generally cylindroid mast fairing at least partially within a submarine sail. The bearing apparatus comprises at least one stave bearing integrated with the fairing and at least one complementary bearing coupled with the sail. Each stave bearing defines a substantially vertical band and has an outer surface which is substantially flush with the outer wall of the fairing. Each complementary bearing tangentially and supportively engages one stave bearing. For those embodiments wherein the bearing apparatus is for retractably mounting the fairing, each complementary bearing slidably engages one stave bearing.

The present invention thus features a stave bearing, any number of which is integrally installed in the mast fairing. Having one or more stave bearings in place in accordance with this invention eliminates the undesirable circumstance attendant the aforementioned conventional configuration whereby a structural bearing is run directly against the fairing surface; instead, in accordance with this invention, a complementary structural bearing is run directly against the surface of a stave bearing which is made of superior bearing material to the fairing material and which is which is made an integral part of the fairing.

The bearing configuration according to the conventional scheme involves structural bearing plus fairing as the two mating elements, with resultant wear of the structural bearings and of the fairing; by contrast, the bearing configuration according to the present invention involves structural bearing plus stave bearing as the two mating elements, with resultant wear of the structural bearings and of the stave bearings. The present invention provides for absence of contiguity of the structural bearings with, and therefore absence of resultant wear of, the fairing itself. The stave bearing and its complementary structural bearing are the facilely, efficiently and economically replaceable mating elements of this invention's bearing configuration. Each stave bearing can be factory-made and ready-to-install by drawing requirement, and/or nominally cut and machined to proper size at the fairing site. Individual fairing requirements in terms of size and installation determine dimensions and curvature of the stave bearing. By providing for maintainance and replacement of stave bearings in lieu of the fairing itself, this invention presents an inherently advantageous fairing bearing methodology in terms of time, ease, expense and efficiency.

Unlike the conventional approach, this invention not only promotes longevity of the fairing by sparing direct wear thereof, but additionally admits of superior bearing materials for lighter wear of the mating elements. Hence, the manifest advantage of this invention—that only the stave bearings, instead of the entire fairing, need be maintained and ultimately replaced as a result of wear—is augmented by a concomitant feature that this invention's stave bearings wear more slowly and consequently necessitate less frequent replacement than does the conventional configuration's fairing. A stave bearing which is used as a mating element with a structural bearing in accordance with this invention is considerably more serviceable than an analogously used fairing.

Moreover, reduced noise accompanies reduced wear of the mating elements. The present invention thus provides improved acoustic signature of the submarine and quieter operation of the submarine's sail communications systems, such as those related to periscopes, antennas and snorkels.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
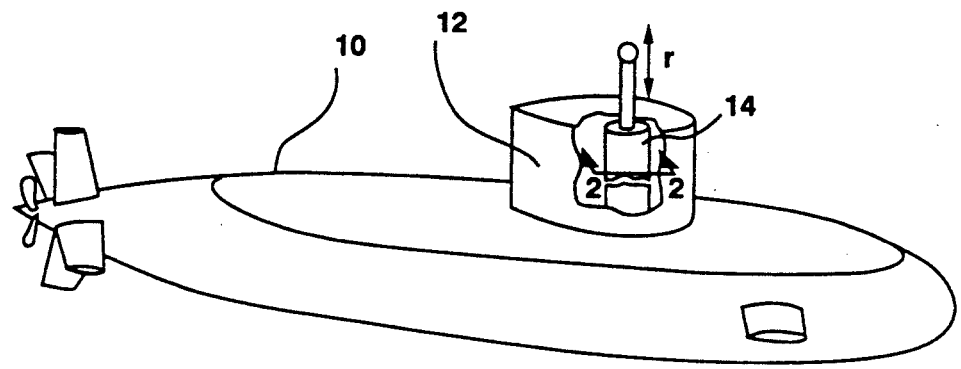
FIG. 1 is a perspective view of a typical submarine having a mast fairing mounted within the sail.

Referring now to FIG. 1, submarine mast fairing 14 is retractably mounted in and upon submarine sail 12 of submarine 10. Sail 12 is that portion of submarine 10 which adjoins and is generally proximate fairing 14. Fairing 14 is a cylindroid with vertical axis which rides slidingly in either axial direction, i.e., either up or down, as indicated by axial direction arrow r, while mounted closely and more or less within sail 12. For most embodiments fairing 14 is made of a composite material such as fiberglass. It is noted that axial direction r need not be vertical or even nearly vertical in accordance with this invention; rather, for most embodiments involving submarine applications axial direction r is substantially vertical, i.e., non-horizontal, in the sense that fairing 14 directionally rides either perpendicularly (i.e., vertically) or obliquely (i.e., non-vertically) with respect to horizontally disposed submarine 10.

Figure 2:
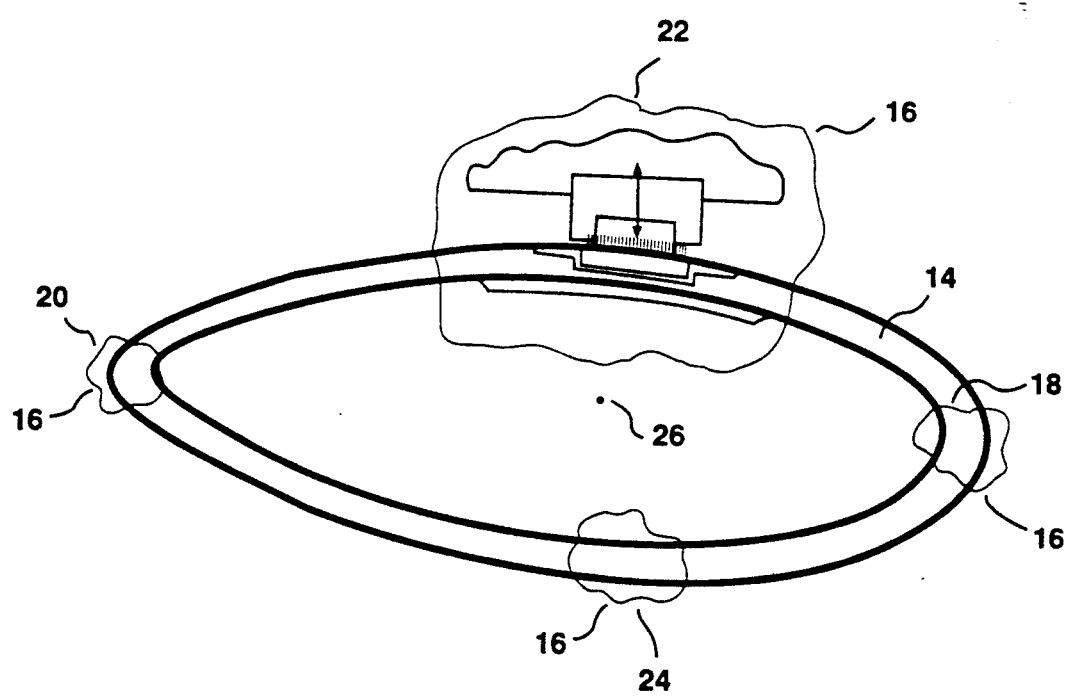
FIG. 2 is a diagrammatic top plan sectional view of the mast fairing mounted within the sail as taken along the plane of the line 2—2 in FIG. 1, along with a diagrammatic top plan sectional detail view of a bearing configuration in accordance with the present invention.

With reference to FIG. 2, bearing configuration 16, the bearing configuration in accordance with this invention, is utilized at four locations around the periphery of fairing 14, viz., forward bearing configuration location 18, aft bearing configuration location 20, port bearing configuration location 22 and starboard bearing configuration location 24. Center 26 of fairing 14, as shown, is the center of the ellipsoid defined by the intersection of axially vertical fairing 14 with horizontal plane 2—2. In this example the four bearing configuration locations are spaced about center 26 of fairing 14 approximately equiangularly, at about right angles. It is noted that any number of bearing configurations in accordance with this invention can appropriately be utilized for various embodiments and applications; moreover, when a plurality of such bearing configurations is utilized, these may be spaced about the periphery of the submarine mast fairing or other generally cylindroid member in any manner as may be deemed appropriate for the particular embodiment or application.

Figure 3:
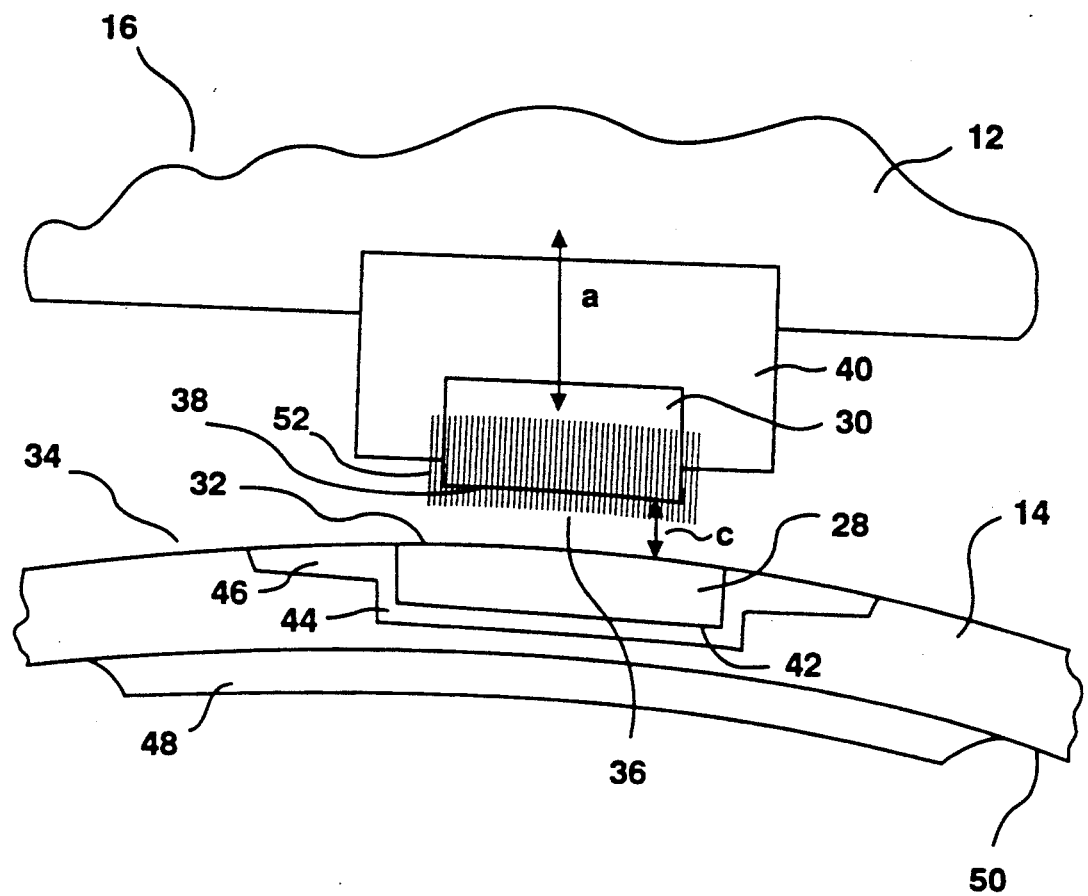
FIG. 3 is the diagrammatic top plan sectional detail view, enlarged, of the bearing configuration shown in FIG. 2.

Reference now being made to FIG. 3, which is an enlargement of the detail view in FIG. 2 of bearing configuration 16 at port bearing configuration location 22, stave bearing 28 and complementary bearing 30 are the bearing mating elements. Complementary bearing 30 is coupled with sail 12. Stave bearing 28 is made an integral part of fairing 14, stave bearing 28 defining a vertical band having an outer surface 32 which is smooth and flush or substantially flush with outer wall 34 of fairing 14. Complementary bearing 30 tangentially and supportively engages stave bearing 28 at bearing interface 36. Complementary bearing 30 has a smooth inner surface 38 which has appropriate size and curvature so as to fit outer surface 32 of stave bearing 28 for tangential and supportive engagement. Outer surface 32 and inner surface 38 are linear in the axial direction so as to permit slidable engagement in the axial direction, the axial direction being vertical direction r as shown in this example.

Complementary bearing 30 is attached to bearing housing 40, which for many embodiments is preferably made of a metallic material. Bearing housing 40 is attached to sail 12 and provides means for coupling complementary bearing 30 with sail 12; sail 12 in turn provides structural support for bearing housing 40 and complementary bearing 30. Attachment arrow a indicates attachment of complementary bearing 30 to bearing housing 40 and of bearing housing 40 to sail 12.

Complementary bearing 30 in this example is adjustable; i.e., complementary bearing 30 provides means for changing the distance, clearance c, at interface 36, between complementary bearing 30 and stave bearing 28. This adjustability feature, advantageous for some embodiments, allows continual on-site accommodation of bearing configuration 16, in terms of maintaining proper running clearance c, to wearing down of stave bearing 28. Also, complementary bearing 30 is preferably made of metallic material for many embodiments.

Referring again to FIG. 3, fairing 14 has been manufactured or machined so as to have groove 42. Stave bearing 26 is of appropriate congruence with groove 42 so as to permit integration of stave bearing 28 with fairing 14 by means of placement of stave bearing 26 in, and attachment of stave bearing 26 to, groove 42.

Reinforcement members of any number, kind and function are preferably utilized for some embodiments or applications of the present invention. Bushing 44 is built, screwed, bolted or otherwise attached into or onto fairing 14. For many embodiments bushing 44 is preferably situated so as to be entirely outside bearing interface 36. Bushing 44 at least partially lines groove 42 of fairing 14 and serves one or more essential or auxiliary functions, depending on the embodiment. Firstly, delamination of the fairing 14 composite skin may occur when groove 42 is machined in fairing 14. For some embodiments bushing 44 is thus tapered at each end, taper 46 as shown, in order to abate or avoid delamination of fairing 14.

Additionally, certain means for integral attachment of stave bearing 28 to fairing 14 are not feasible or advisable for some submarine applications, since either or both of fairing 14 and stave bearing 28 are made of a non-metallic material for most embodiments of the present invention, and particularly since fairing 14, when made of a composite material such as fiberglass, does not admit of fastening means such as screwing or bolting which would involve threading of the composite material. Fairing 14 of submarine 10 is most frequently made of fiberglass or other composite material. For many embodiments of this invention stave bearing 28 is preferably made of ultra high density molecular weight polyethelene or other plastic or resin material. Bushing 44 thus provides means for integrally attaching stave bearing 28 to fairing 14 which would otherwise be impossible or impractical in the absence of bushing 44; particularly, bushing 44 provides fastening means such as screwing or bolting whereby the bushing is threaded and the need to thread the fairing is obviated.

For some embodiments of the present invention bushing 44 provides supplementary means for integrally attaching stave bearing 28 to fairing 14. For other embodiments, bushing 44 provides primary or exclusive means for integrally attaching stave bearing 28 to fairing 14. For yet other embodiments, bushing 44 is not utilized at all for bearing configuration 16, or bushing 44 is utilized but not for this fastening purpose.

Bushing 44 is preferably made of a metallic material for many embodiments, especially for those embodiments which incorporate at least one bushing 44 which is desired to provide threadability for purposes of fastening, as discussed hereinabove. For some of these embodiments bushing 44 is preferably made of a corrosion-resistant metallic material.

Furthermore, for some embodiments bushing 44 provides strengthening or fortification for fairing 14. In this regard, some embodiments of this invention include one or more of a reinforcement member, not a bushing, for strengthening or fortifying fairing 14. For example, mold 48 lines at least a portion of inner wall 50 of fairing 14 and thus reinforces fairing 14.

For some embodiments it is preferable to include means for filtering particles in order to prevent or partially prevent debris, contaminants and other particulates from entering bearing interface 36. A plurality of bristles 52, for example, is attached to bearing housing 40 and at least partially surrounds the periphery of inner surface 38 of complementary bearing 30 so as to act as a barrier to entrance of particles into bearing interface 36. These particles are thus impeded from becoming trapped in bearing interface 36 and thereby becoming abrasive elements which increase wear of outer surface 32 and inner surface 38 and therefore decrease useful life of stave bearing 28 and complementary bearing 30. For some embodiments bristles 52 are selective in accordance with the size of the particles, blocking only larger-sized particles; the smaller-sized particles are thus allowed to pass through bearing interface 36 harmlessly, i.e., without imposing significant trapping characteristic.

Easy and efficient, replaceability of parts is featured by the present invention. Any one, some or all among stave bearing 28, complementary bearing 30, bearing housing 40, bushing 44, mold 48 and/or bristles 52 are conveniently replaced in accordance with many various embodiments of the present invention.

This invention additionally features easily attainable color coordination of the visible components, thus satisfying camouflage requirements of many submarine mast fairing systems. For example, black dye is readily used to color ultra high density molecular weight polyethelene stave bearing 28 black, thus matching in color black fairing 14 and black sail 12. The visible portions of the components of bearing configuration 16 can be made any color, and for components of bearing configuration 16 of any material. Hence, portions of at least sail 12, fairing 14 and stave bearing 28 would typically be exteriorly visible in accordance with this invention, and can be dyed or painted or otherwise made to appear the same or substantially the same color. For those embodiments wherein bushing 44 is utilized, bushing 44 can be similarly camouflaged. For some embodiments color concordance of the entire submarine 10 is desirable. Harmonization of dark colors is preferable for camouflage purposes for some embodiments.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Bearing apparatus for mounting closely and substantially vertically a generally cylindroid member at least partially within a generally ellipsoid hole in a structure, comprising:

at least one stave bearing integrated with said member, each said stave bearing defining a substantially vertical band having an outer surface which is substantially flush with the outer wall of said member;

at least one complementary bearing coupled with said structure, each said complementary bearing tangentially and supportively engaging one said stave bearing; and a plurality of bristles for filtering particles and thus preventing said particles from entering at least one interface between a said complementary bearing and a said stave bearing which said complementary bearing is engaging.

2. Bearing apparatus as in claim 1, wherein at least one said stave bearing is made of ultra high density molecular weight polyethelene.

3. Bearing apparatus as in claim 1, wherein said member is made of a fiberglass material.

4. Bearing apparatus as in claim 1, wherein at least one said complementary bearing is metallic.

5. Bearing apparatus as in claim 1, further comprising at least one bushing for said integrating of at least one said stave bearing with said member.

6. Bearing apparatus as in claim 5, wherein at least one said bushing is metallic.

7. Bearing apparatus as in claim 5, wherein at least one said bushing reinforces said member.

8. Bearing apparatus as in claim 1, further comprising at least one bearing housing for said coupling of at least one said complementary bearing with said structure.

9. Bearing apparatus as in claim 8, wherein at least one said bearing housing includes means for adjusting at least one said complementary bearing, and said means for adjusting includes means for changing the distance between a said complementary bearing and a stave bearing at at least one said interface between a said complementary bearing and a said stave bearing which said complementary bearing is engaging.

10. Bearing apparatus as in claim 1, wherein said apparatus is for retractably mounting said member and each said complementary bearing slidably engages one said stave bearing.

11. Bearing apparatus as in claim 1, further comprising at least one reinforcement object for reinforcing said member.

12. Bearing apparatus as in claim 1, wherein said member is a mast fairing and said structure is a submarine sail.

13. Bearing apparatus as in claim 12, wherein each said stave bearing, said fairing and said sail are exteriorly visibly camouflaged.

14. Bearing apparatus as in claim 1, wherein said bristles are selectively preventive in accordance with the sizes of said particles.

15. Bearing apparatus as in claim 11, wherein said reinforcement object is a mold which at least partially lines said member.

16. Bearing apparatus for mounting closely, retractably and substantially vertically a generally cylindroid fiberglass mast fairing at least partially within a generally ellipsoid hold in a submarine sail, comprising:
at least one ultra high density molecular weight polyethelene stave bearing integrated with said fairing, each said stave bearing defining a substantially vertical band having an outer surface which is substantially flush with the outer wall of said fairing;
at least one metallic complementary bearing coupled with said sail, each said complementary bearing tangentially, slidably and supportively engaging one said stave bearing;
at least one metallic bushing for at least one said integrating of a said stave bearing with said fairing;
at least on adjustable bearing housing for at least one said coupling of a said complementary bearing with said sail and for changing the clearance at at least one interface between a said complementary bearing and a said stave bearing which said complementary bearing is engaging;
at least one mold which at least partially lines said fairing, for reinforcing said fairing; and
a plurality of bristles for filtering particles and thus preventing said particles from entering at least one said interface between a said complementary bearing and a said stave bearing which said complementary bearing is engaging.

17. Bearing apparatus as in claim 16, wherein each said stave bearing, said fairing and said sail are exteriorly visibly camouflaged.

18. Bearing apparatus as in claim 16, comprising four said stave bearings, four said complementary bearings, four said bushings and four said bearing housings, each said stave bearing located substantially opposite one other said stave bearing and substantially at right angles with respect to two other said stave bearings, each said complementary bearing located substantially opposite one other said complementary bearing and substantially at right angles with respect to two other said complimentary bearings, each said bushing located substantially opposite one other said bushing and substantially at right angles with respect to two other said bushings, and each said bearing housing located substantially opposite one other said bearing housing and substantially at right angles with respect to two other said bearing housings.

19. Bearing apparatus for mounting closely, retractably and axially projectingly a generally cylindroid member at least partially within a generally ellipsoid hole in a structure, comprising:
a plurality of stave bearings integrated with said member; and
a plurality of complementary bearings coupled with said structure;
a plurality of adjustable bearing housings;
each said stave bearing defining a band which longitudinally extends in a substantially axial direction and having an outer surface which is substantially flush with the outer wall of said member;
each said complementary bearing tangentially, slidably and supportively engaging one said stave bearing;
the locations of said engagements of a said complementary bearing with a said stave bearing being spaced approximately equiangularly about said axis of said member;
each said adjustable bearing housing being for a said coupling of a said complementary bearing with said sail and for changing the clearance at each interface between a said complementary bearing and a said stave bearing which said complementary bearing is engaging.

* * * * *